United States Patent [19]

Haytner et al.

[11] Patent Number: 5,469,897
[45] Date of Patent: Nov. 28, 1995

[54] APPARATUS FOR FILLING GREASE GUNS

[76] Inventors: Oren Haytner; Avi Haytner, both of 1 Kaplan Street, Petach Tikva, Israel, 49202

[21] Appl. No.: 296,103

[22] Filed: Aug. 25, 1994

[30] Foreign Application Priority Data

Aug. 27, 1993 [IL] Israel .......... 106825

[51] Int. Cl.⁶ .......... F16N 37/02
[52] U.S. Cl. .......... 141/27; 141/2; 141/23; 141/357; 141/368; 141/383; 141/386; 277/197; 222/386
[58] Field of Search .......... 141/18, 21–28, 141/357, 368, 383, 386, 2; 222/386; 277/197

[56] References Cited

U.S. PATENT DOCUMENTS

| | | | |
|---|---|---|---|
| 2,258,576 | 10/1941 | Madsen | 277/197 |
| 2,268,592 | 1/1942 | Hothersall | 141/27 |
| 2,328,363 | 8/1943 | Sundholm | 141/27 |
| 2,517,551 | 8/1950 | Eckman | 141/27 |
| 2,545,531 | 3/1951 | Sands | 141/357 |
| 2,545,605 | 3/1951 | Canine | 141/357 X |
| 2,601,169 | 6/1952 | Purvis | 141/27 |
| 2,636,658 | 4/1953 | Baumer et al. | 141/357 |
| 2,768,661 | 10/1956 | Tyler | 141/357 |
| 2,811,991 | 11/1957 | Switzer | 141/21 |
| 4,483,375 | 11/1984 | Martin | 141/27 |
| 5,133,564 | 7/1992 | Chang | 277/197 X |

FOREIGN PATENT DOCUMENTS 2040419  2/1972  Germany .

Primary Examiner—J. Casimer Jacyna
Attorney, Agent, or Firm—Darby & Darby

[57] ABSTRACT

The present disclosure describes an apparatus and method for filling grease guns. The apparatus comprises a top member sealingly and slidable engageable with the interior of a grease container having a generally uniform or non-uniform cross-section. The top member including a socket for sealingly and removably receiving a grease gun body, whereby drawing of grease into the grease gun by rearward movement of a piston in the grease gun body provides suction which causes the top member to inwardly in the grease container and the grease top be forced into the grease gun body.

10 Claims, 9 Drawing Sheets

APPARATUS FOR FILLING GREASE GUNS

FIELD OF THE INVENTION

The present invention relates to apparatus for filling grease guns.

BACKGROUND OF THE INVENTION

Automatic, central grease gun systems are well known and employ pneumatic energy systems to move grease from a barrel to a grease gun. Relatively small scale operations whose size does not justify the installation of such automatic, central grease gun systems do not have a convenient way of filling grease guns. Such filling is thus done by hand and is messy, time consuming and wasteful.

SUMMARY OF THE INVENTION

The present invention seeks to provide apparatus for relatively easy, convenient and speedy filling of grease guns.

There is thus provided in accordance with a preferred embodiment of the present invention apparatus for filling grease guns including a top member sealingly and slidably engageable with the interior of a grease container having a generally uniform cross section, the top member including a socket for sealingly and removably receiving a grease gun body, whereby drawing of grease into the grease gun by rearward movement of a piston in the grease gun body provides suction which causes the top member to move inwardly in the grease container and grease to be forced into the grease gun body.

In accordance with a preferred embodiment of the present invention, the top member includes an outer peripheral seal member for sealing slidable engagement with the interior of a grease container, such as a conventional grease bucket, and an inner peripheral seal member for removable sealed engagement with the exterior of a grease gun body.

Preferably, the inner peripheral seal member is retained by a washer and a threaded bushing onto the top member.

In accordance with one embodiment of the invention, the grease container has a generally cylindrical inner configuration.

In accordance with an alternative embodiment of the invention, the grease container has a non-cylindrical configuration, such as tapered side walls defining a decreasing cross sectional radius towards the bottom of the container. In this case, the top member includes sealing apparatus adapted to sealingly engage the interior of the container along a range of depths therealong at which the interior of the container has a range of diameters.

According to one embodiment of the invention, the top member includes plural sealing rings with non-juxtaposed slits formed therein thereby enabling them to compress to fit various diameters.

Additionally or alternatively, the top member includes a peripheral slit flexibly inclined seal.

BRIEF DESCRIPTION OF THE DRAWINGS

The present invention will be understood and appreciated more fully from the following detailed description, taken in conjunction with the drawings in which.

DETAILED DESCRIPTION OF A PREFERRED EMBODIMENT

Figure 1:
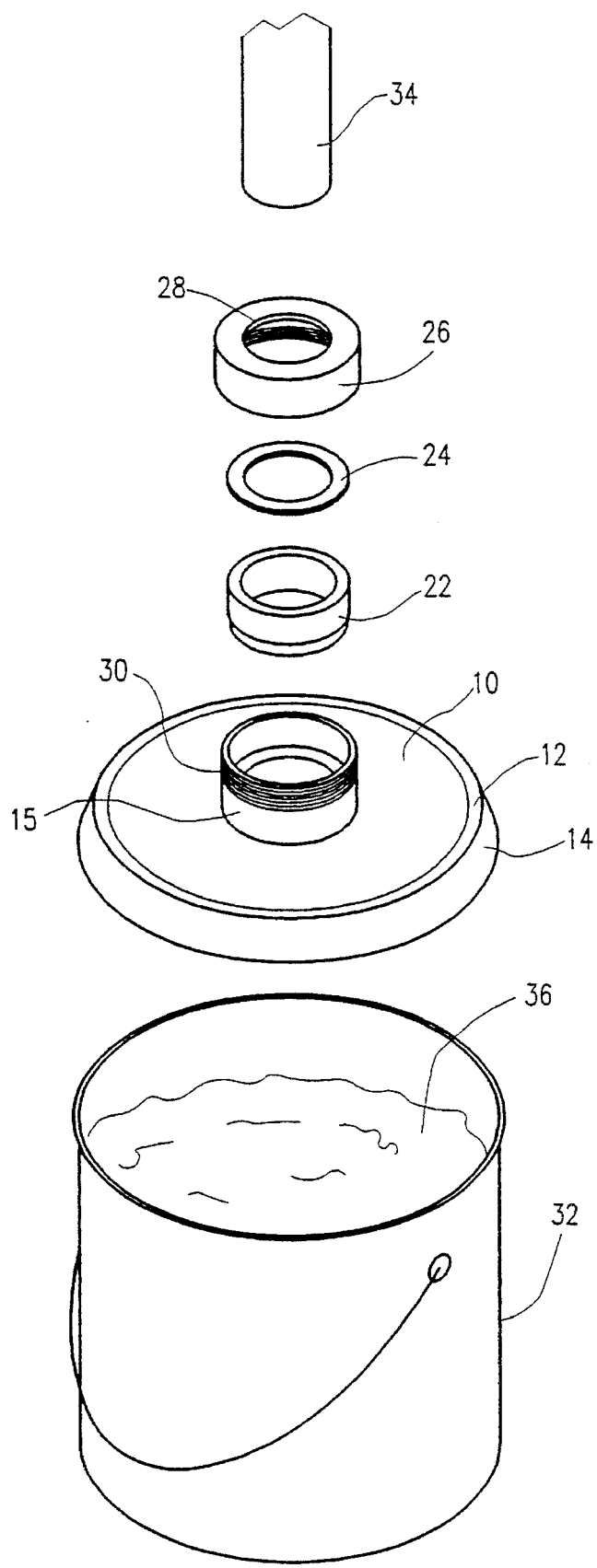
FIG. 1 is an exploded view illustration of grease gun filling apparatus constructed and operative in accordance with a preferred embodiment of the present invention in operative engagement with a grease bucket and a grease gun body.

Reference is now made to FIGS. 1–3C, which illustrate apparatus for filling grease guns constructed and operative in accordance with a preferred embodiment of the present invention.

As seen in FIGS. 1 and 3A–3C, the apparatus for filling grease guns comprises a generally disc shaped top member 10, typically formed of high strength plastic or metal, onto which is mounted an outer peripheral seal 12. Peripheral seal 12 is preferably formed of rubber or any other resilient material and may include a downward facing flap 14 which provides enhanced sealing.

Top member 10 is formed with a central raised portion 15 through which extends a bore 16 including a relatively narrower lower portion 18, generally lying in the same plane as the main, disc shaped part of the top member, and a relatively wider upper portion 20, which lies generally in the raised portion 15. A peripheral shoulder 21 is thus defined between lower portion 18 and upper portion 20 of bore 16.

An inner peripheral seal 22 is formed in a suitable recess formed in the interior of raised portion 15 and is partially retained by a metal washer 24. The metal washer 24 is, in turn, retained by a threaded collar member 26 having internal threading 28 which threadably engages external threading 30 on raised portion 15.

The top member is seated inside a grease container 32, preferably having a uniform cross section, which is normally, but need not necessarily be circular. The body portion 34 of a grease gun to be filled is removably inserted in the upper portion 20 of bore 16 against shoulder 21.

Figure 2A:
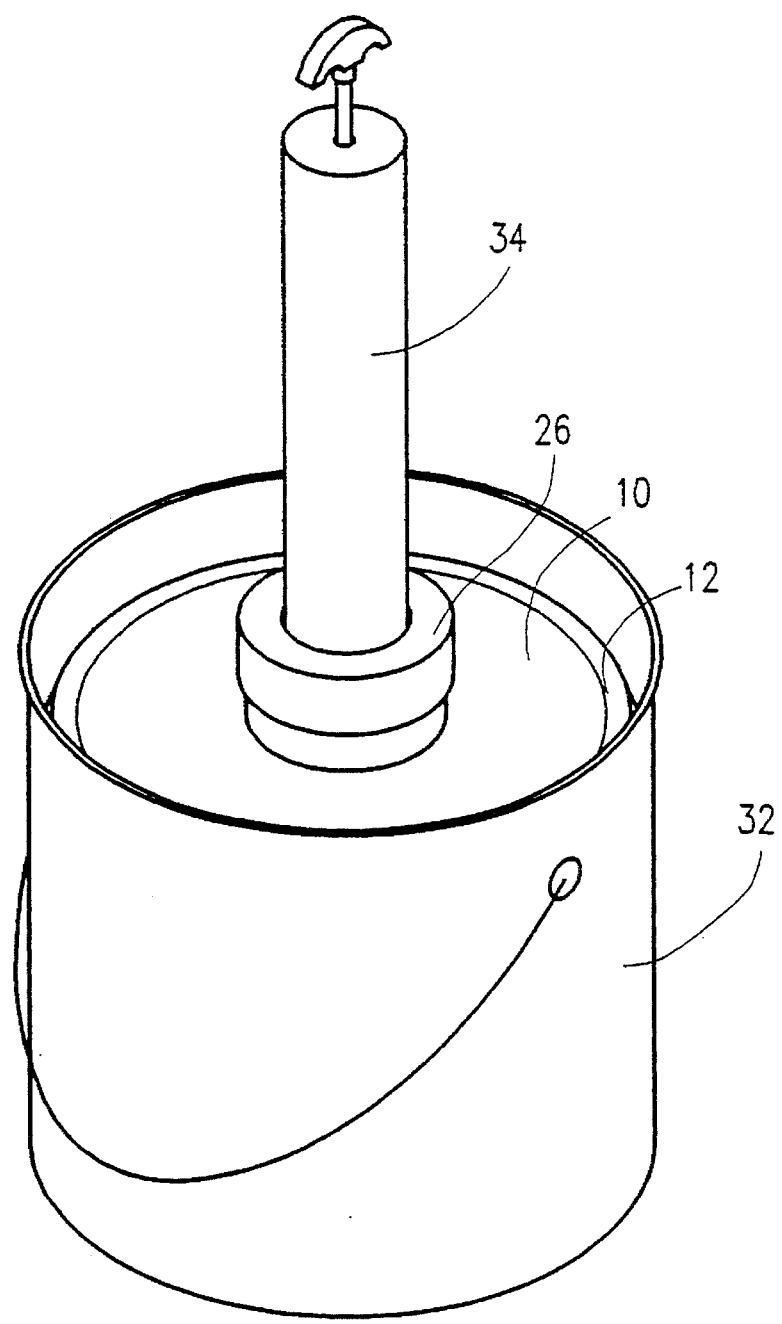
FIGS. 2A and 2B are pictorial illustrations showing two stages of filling of a grease gun using the apparatus of the present invention.
Figure 2B:
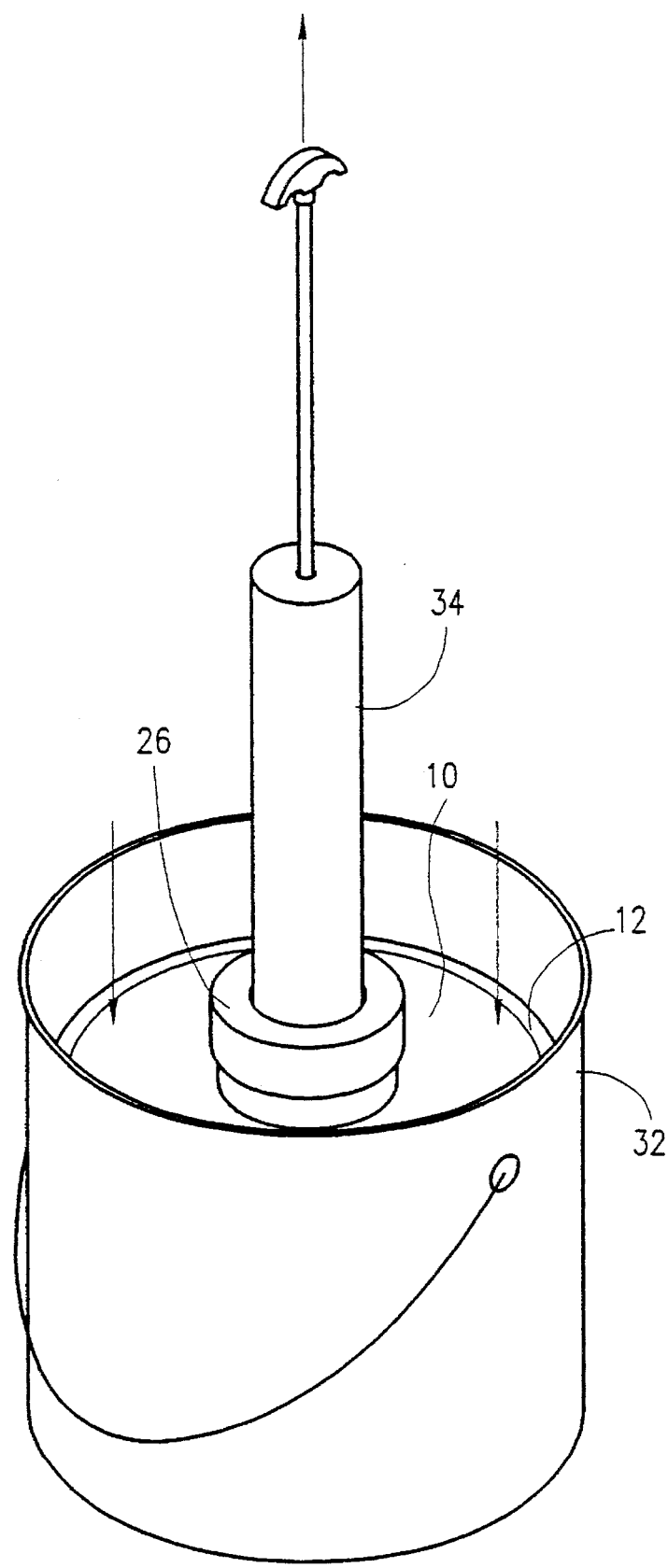
Figure 3A:
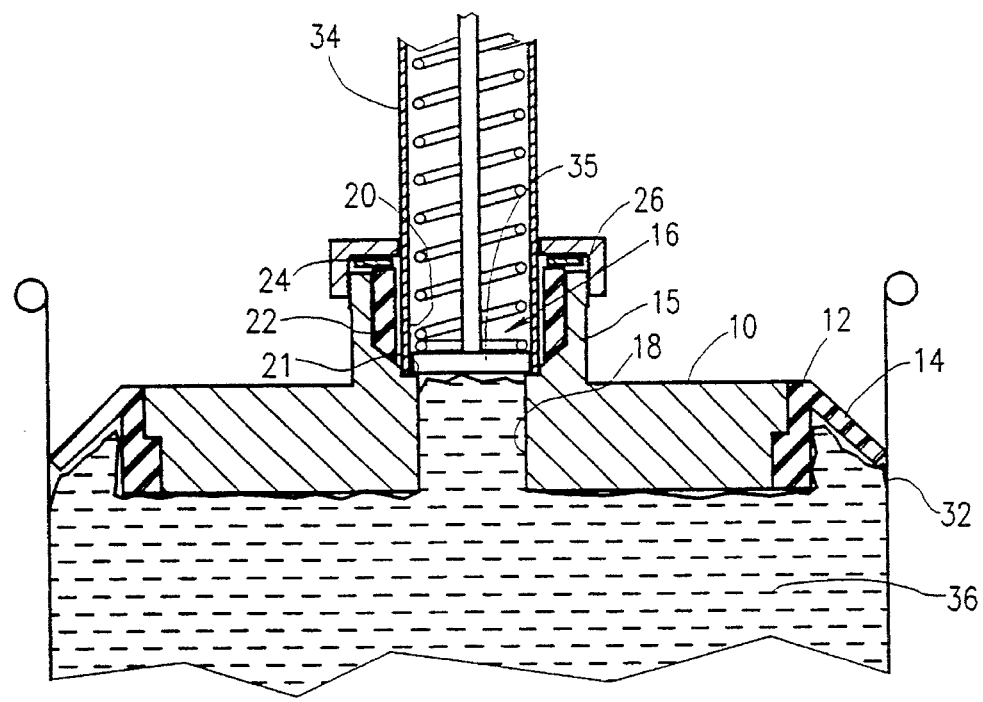
FIGS. 3A, 3B and 3C are sectional illustrations which illustrate three different stages in the operation of the grease gun filling apparatus of the present invention.

Prior to insertion of the grease gun body into bore 16 in sealing engagement with the top member 10, the grease gun piston 35 is fully extended, as seen in FIGS. 2A and 3A. Thereafter, retraction of the piston to an extreme position as shown in FIG. 2B, produces suction in the space below the top member 10 and the grease container 32, forcing the top member 10 downwardly and forcing grease from the container 32 upwardly into the body of the grease gun.

Figure 3B:
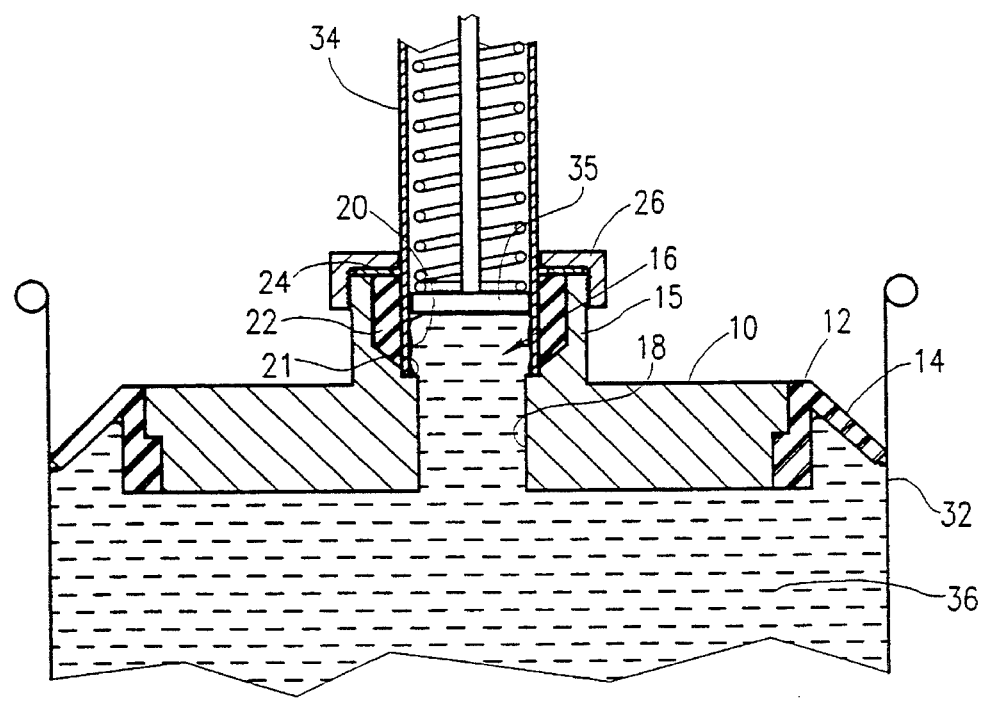
Figure 3C:
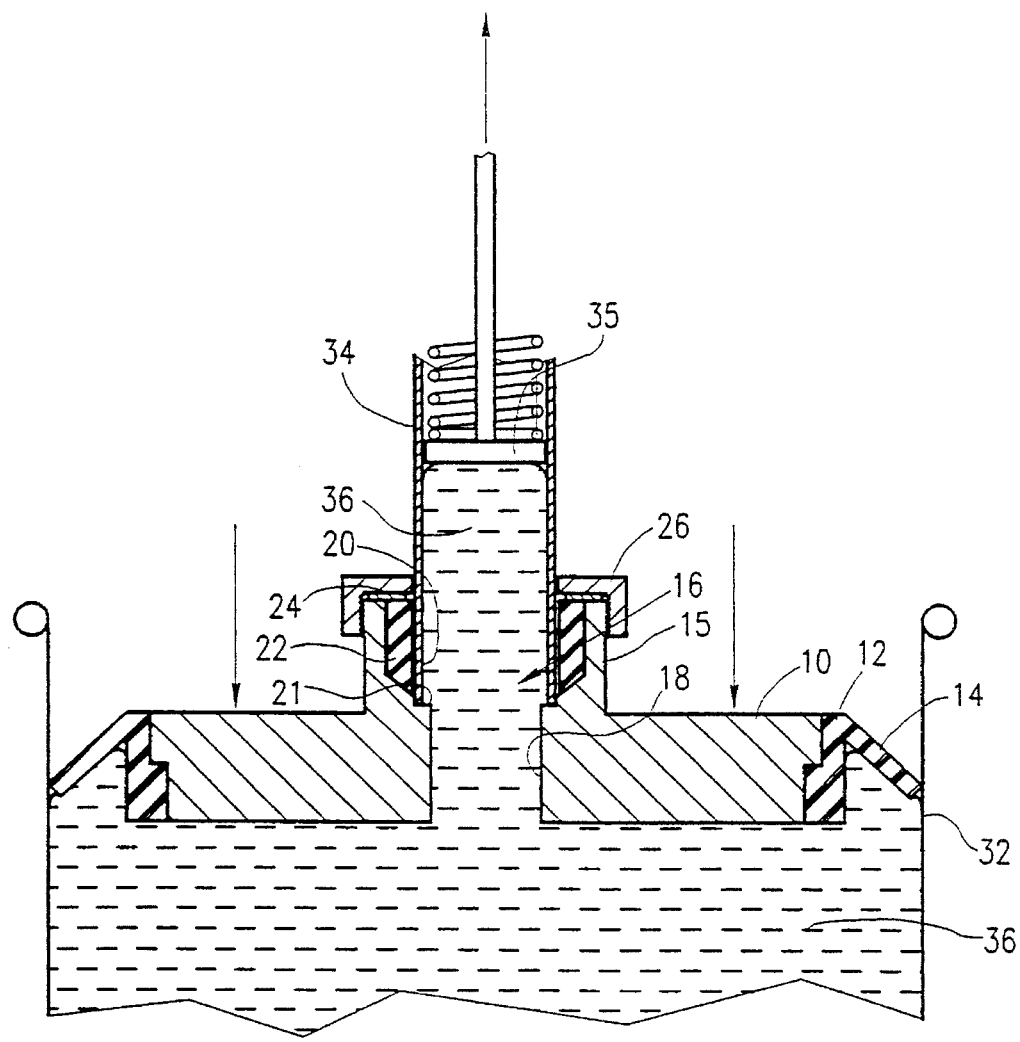

FIGS. 3A, 3B and 3C illustrate respectively, the orientation of the apparatus prior to retraction of the piston 35, upon partial retraction and upon suction of grease 36 into the grease gun body.

Figure 4:
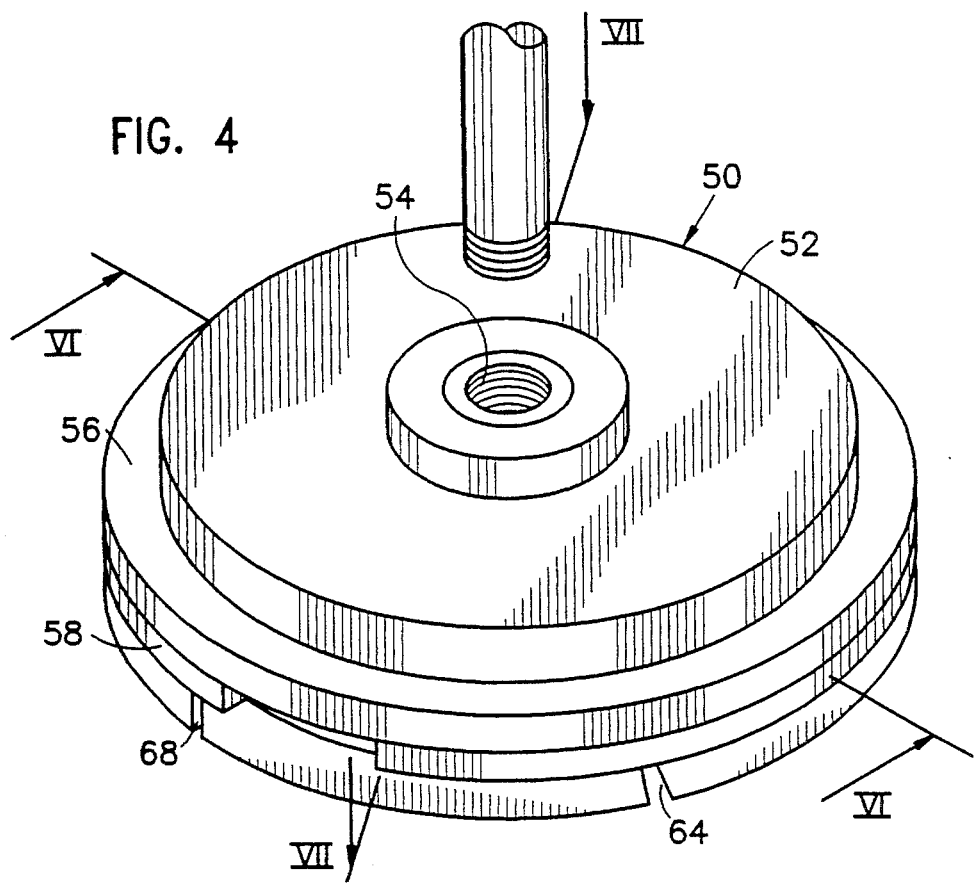
FIG. 4 is a pictorial illustration of a portion of grease gun filling apparatus constructed and operative in accordance with an alternative embodiment of the present invention.
Figure 5:
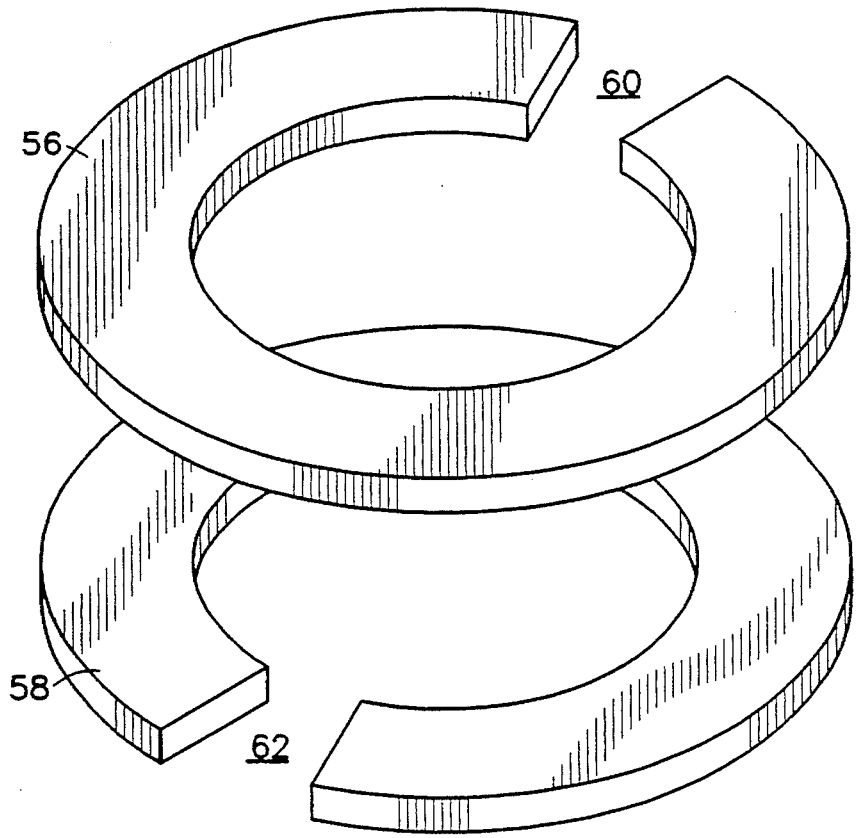
FIG. 5 is a pictorial illustration of a pair of variable radius sealing rings useful in the apparatus of FIG. 4.
Figure 6A:
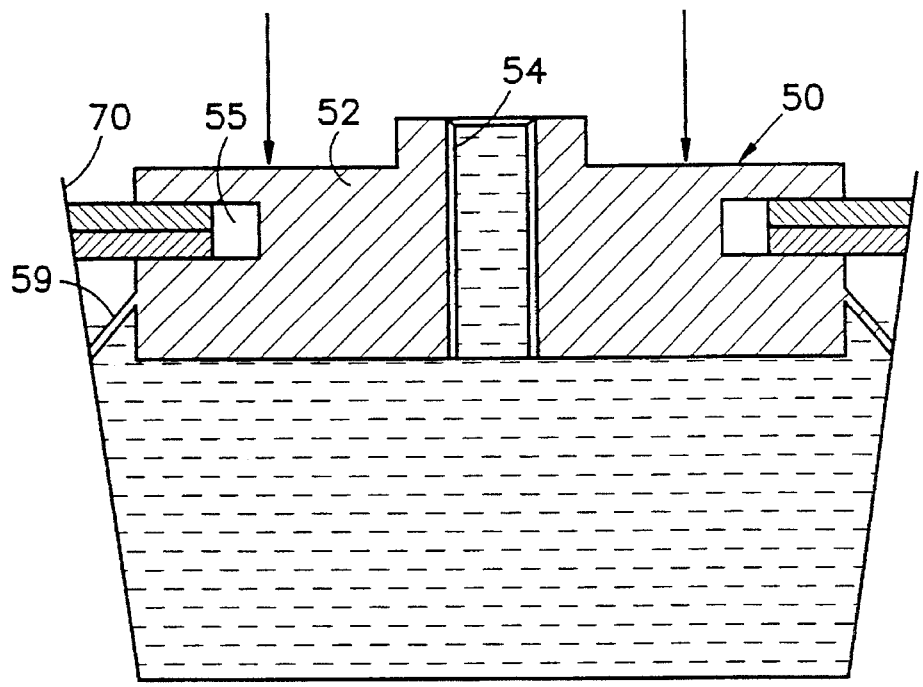
FIGS. 6A and 6B are illustrations of the apparatus of FIGS. 4 and 5, taken along lines VI—VI in FIG. 4, in operative engagement with a tapered grease container.
Figure 6B:
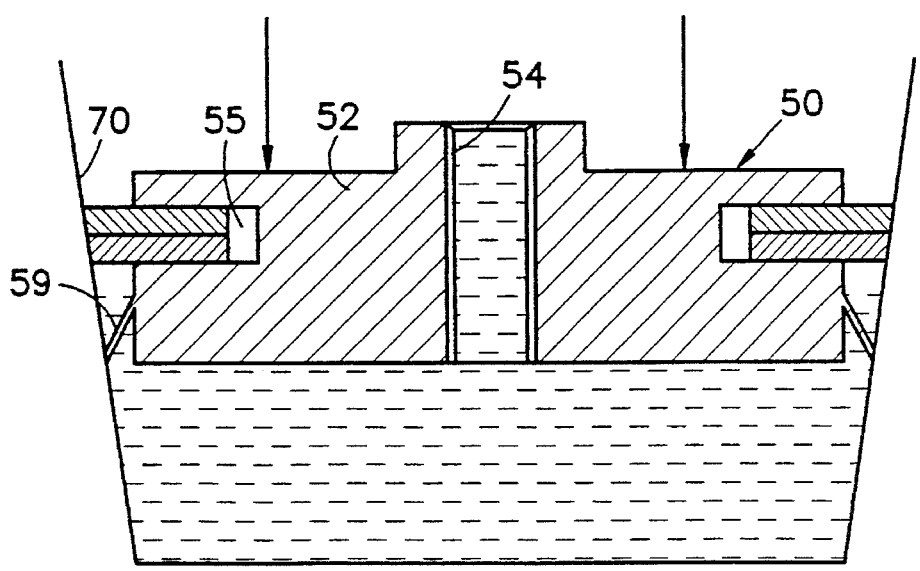
Figure 7:
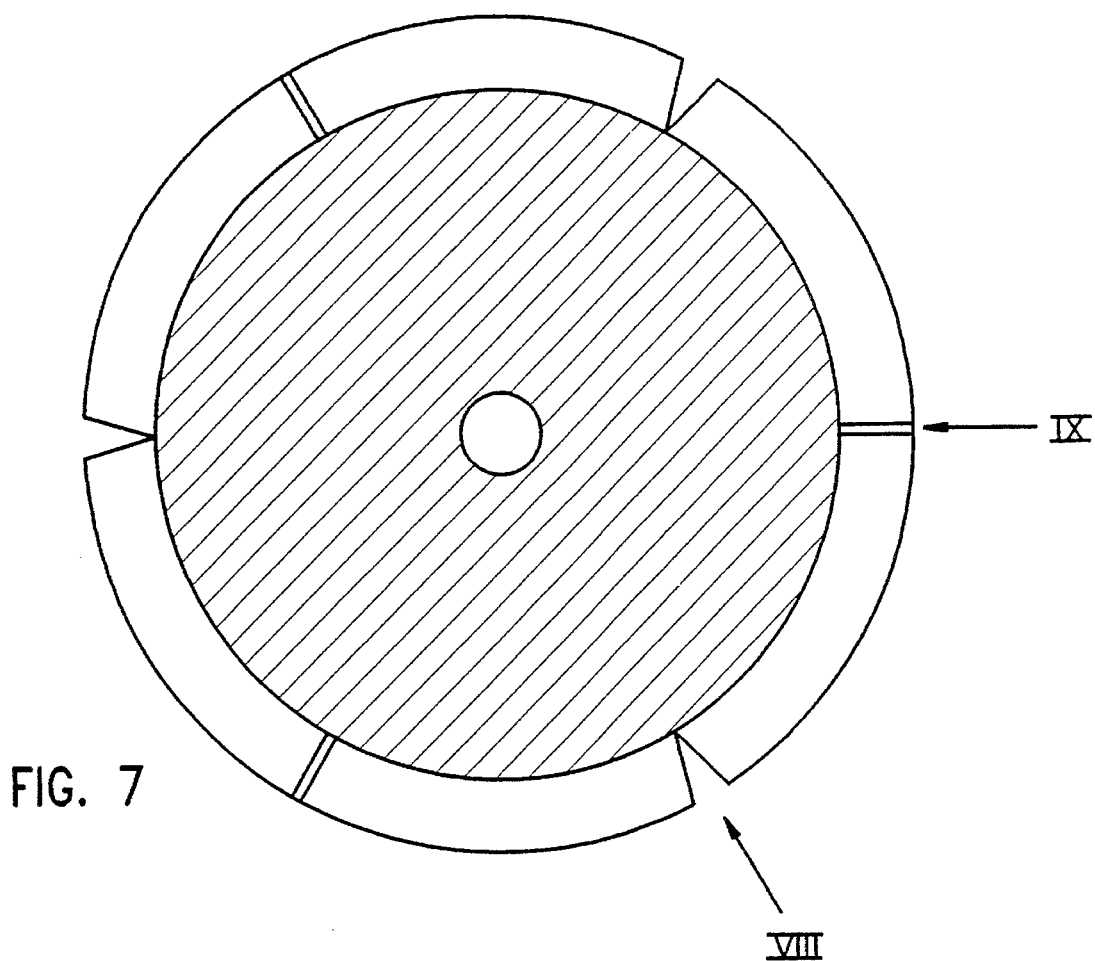
FIGS. 7, 8 and 9 are sectional illustrations, taken respectively along lines VII—VII in FIG. 4 and lines VIII—VIII and IX—IX in FIG. 7.
Figures 8, 9:
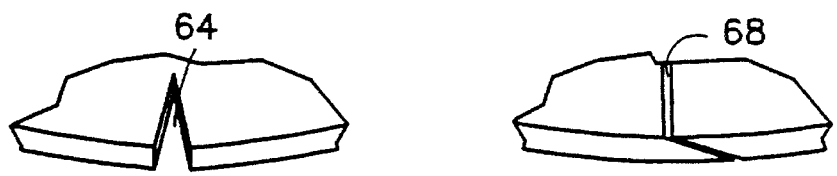

Reference is now made to FIG. 4, which is a pictorial illustration of a portion of grease gun filling apparatus constructed and operative in accordance with an alternative embodiment of the present invention, and to FIG. 5, which is a pictorial illustration of a pair of variable radius sealing rings useful in the apparatus of FIG. 4, as well as to FIGS. 7–9. The apparatus of FIGS. 4–9 is useful with grease containers having tapered wall surfaces, as seen particularly in FIGS. 6A and 6B.

As seen in FIGS. 4–9, the grease gun filling apparatus includes a top member 50, typically comprising a generally circular body portion 52 defining a threaded central inlet 54 and an annular recess 55. Disposed in annular recess 55 are a pair of split sealing rings 56 and 58, which are shown particularly in FIG. 5. It is seen that preferably rings 56 and 58 have their respective slits 60 and 62 in a non-mutually juxtaposed orientation.

Preferably circular body portion 52 is also provided with a downwardly extending, integrally formed, multiply slit, flexibly inclined seal 59. It is noted that two different types of slits are formed in seal 59 and are indicated respectively by reference numerals 64 and 68 and illustrated particularly in FIGS. 8 and 9. It is noted that seal 59 may be provided with slits of type 64 only or of type 68 only or any combination thereof.

Both sealing rings 56 and 58 and flexibly inclined seal 59 continuously sealingly engage the inner tapered surface of a grease container 70, as the top member 50 moves downward towards the bottom of the container, as seen in FIGS. 6A and 6B.

Figure 10A:
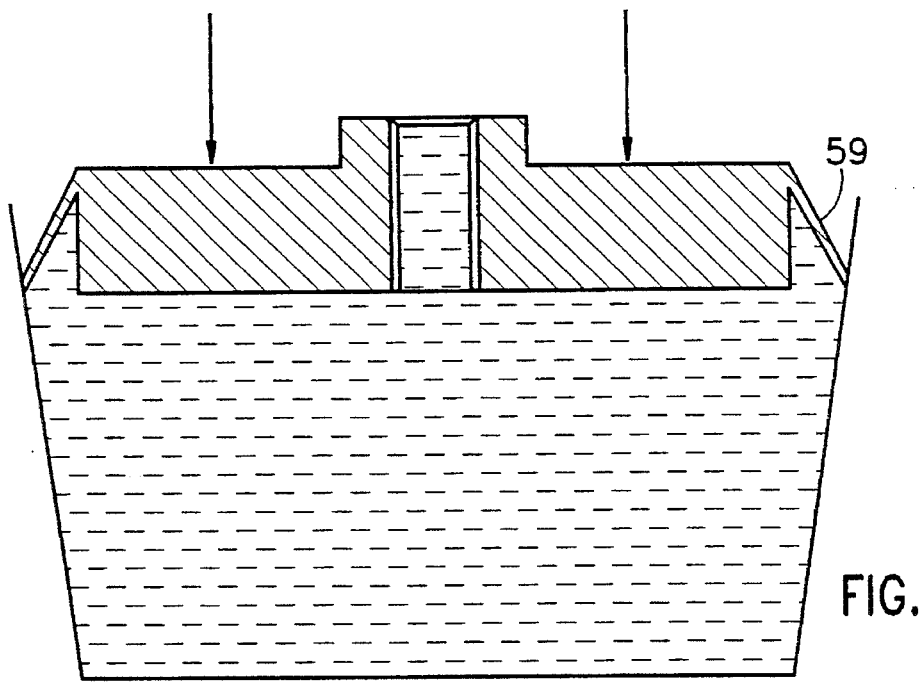
FIGS. 10A and 10B are sectional illustrations of another embodiment of grease gun filling apparatus in operative engagement with a tapered grease container.
Figure 10B:
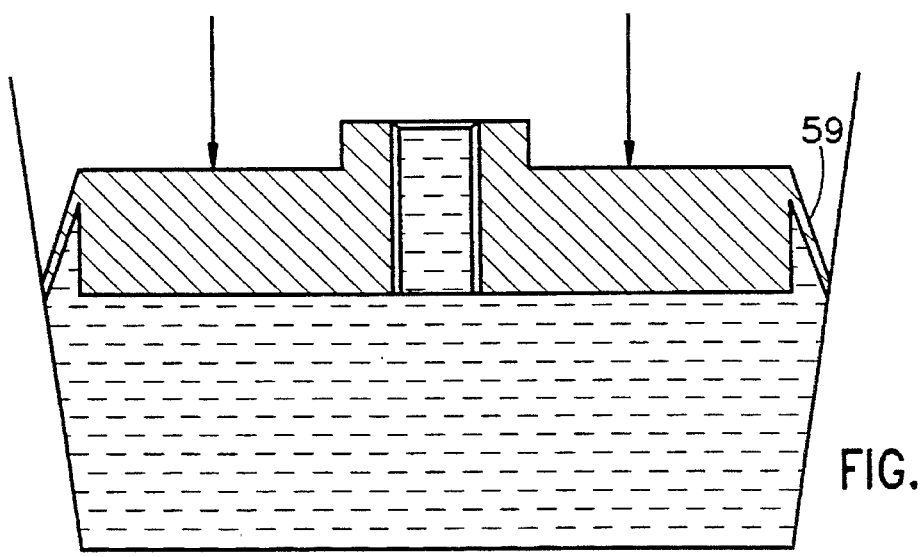

Reference is now made to FIGS. 10A and 10B, which are sectional illustrations of another embodiment of grease gun filling apparatus in operative engagement with a tapered grease container. In this embodiment the sealing rings 56 and 58 are omitted and only flexibly inclined seal 59 is provided.

Alternatively, it is appreciated that in another embodiment of grease gun filling apparatus for use with a tapered grease container, seal 59 is omitted and only sealing rings 56 and 58 are provided.

It will be appreciated by persons skilled in the art that the present invention is not limited by what has been particularly shown and described hereinabove. Rather the scope of the present invention is defined only by the claims which follow:

The invention claimed is:

1. Apparatus for filling grease guns comprising:

a top member sealingly and slidably engageable with the interior of a grease container along the periphery of the top member, the top member including a socket for sealingly and removably receiving a grease gun body, whereby drawing of grease into the grease gun by rearward movement of a piston in the grease gun body provides suction which causes the top member to move inwardly in the grease container and grease to be forced into the grease gun body, the top member including a flexibly inclined peripheral seal having multiple generally radially extending slits formed therein.

2. Apparatus according to claim 1 and wherein said top member includes an outer peripheral seal member for sealing slidable engagement with the interior of a grease container, such as a conventional grease bucket, and an inner peripheral seal member for removable sealed engagement with the exterior of a grease gun body.

3. Apparatus according to claim 2 and wherein said inner peripheral seal member is retained by a washer and a threaded bushing onto the top member.

4. Apparatus according to claim 3 and wherein the grease container has a non-cylindrical configuration, including tapered side walls defining a decreasing cross sectional radius towards the bottom of the container and wherein said top member includes sealing apparatus adapted to sealingly engage the interior of the container along a range of depths therealong at which the interior of the container has a range of radii.

5. Apparatus according to claim 2 and wherein the grease container has a non-cylindrical configuration, including tapered side walls defining a decreasing cross sectional radius towards the bottom of the container and wherein said top member includes sealing apparatus adapted to sealingly engage the interior of the container along a range of depths therealong at which the interior of the container has a range of radii.

6. Apparatus according to claim 1 and wherein the grease container has a non-cylindrical configuration, including tapered side walls defining a decreasing cross sectional radius towards the bottom of the container and wherein said top member includes sealing apparatus adapted to sealingly engage the interior of the container along a range of depths therealong at which the interior of the container has a range of radii.

7. Apparatus according to claim 1 and wherein said top member includes plural sealing rings with non-juxtaposed slits formed therein thereby enabling them to compress to fit various diameters.

8. Apparatus according to claim 1 and wherein said radially extending slits include notch type slits.

9. Apparatus according to claim 1 and wherein said radially extending slits include slits which are configured to leave adjacent portions of the seal in mutually overlapping arrangement.

10. A method of filling a grease gun comprising the steps of:

providing a top member, including a flexibly inclined peripheral seal having multiple generally radially extending slits formed therein, in sealing and slidable engagement with the interior of a grease container along the periphery of the top member;

removably and sealingly inserting a grease gun body to be filled in a socket in the top member; and drawing of grease into the grease gun by rearward movement of a piston in the grease gun body, thereby providing suction which causes the top member to move inwardly in the grease container and grease to be forced into the grease gun body.

\* \* \* \* \*